US010502253B2

(12) United States Patent
Watanabe et al.

(10) Patent No.: US 10,502,253 B2
(45) Date of Patent: Dec. 10, 2019

(54) MACHINE LEARNING DEVICE FOR LEARNING ASSEMBLY OPERATION AND COMPONENT ASSEMBLY SYSTEM

(71) Applicant: FANUC CORPORATION, Yamanashi (JP)

(72) Inventors: Masato Watanabe, Yamanashi (JP); Taku Sasaki, Yamanashi (JP); Kiichi Inaba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 188 days.

(21) Appl. No.: 15/835,651

(22) Filed: Dec. 8, 2017

(65) Prior Publication Data
US 2018/0180085 A1 Jun. 28, 2018

(30) Foreign Application Priority Data
Dec. 26, 2016 (JP) ................................ 2016-251868

(51) Int. Cl.
*G06F 15/18* (2006.01)
*F16B 33/06* (2006.01)
*G05B 19/418* (2006.01)

(52) U.S. Cl.
CPC ........ *F16B 33/06* (2013.01); *G05B 19/41805* (2013.01); *G05B 2219/45203* (2013.01)

(58) Field of Classification Search
CPC ........................................................ G06F 15/18
USPC ....................................................... 706/15, 45
See application file for complete search history.

(56) References Cited

FOREIGN PATENT DOCUMENTS

| JP | H9-258814 A | 10/1997 |
|----|---|---|
| JP | H9-319420 A | 12/1997 |
| JP | 2011-88225 A | 5/2011 |
| JP | 2014-007890 A | 1/2014 |
| JP | 2015-114722 A | 6/2015 |
| JP | 2016-43418 A | 4/2016 |
| JP | 5969676 B1 | 8/2016 |

*Primary Examiner* — David R Vincent
(74) *Attorney, Agent, or Firm* — Hauptman Ham, LLP (57) ABSTRACT

A machine learning device includes a state observation unit for observing state variables that include at least one of the state of an assembly constituted of first and second components, an assembly time and information on a force, the result of a continuity test on the assembly, and at least one of position and posture command values for at least one of the first and second components and direction, speed and force command values for an assembly operation; and a learning unit for learning, in a related manner, at least one of the state of the assembly, the assembly time and the information on the force, the result of the continuity test on the assembly, and at least one of the position and posture command values for at least one of the first and second components and the direction, speed and force command values for the assembly operation.

7 Claims, 9 Drawing Sheets

MACHINE LEARNING DEVICE FOR LEARNING ASSEMBLY OPERATION AND COMPONENT ASSEMBLY SYSTEM

RELATED APPLICATIONS

The present application claims priority to Japanese Patent Application No. 2016-251868 filed Dec. 26, 2016, the disclosure of which is hereby incorporated by reference herein in its entirety.

BACKGROUND OF THE INVENTION

1. Field of the Invention

The present invention relates to a machine learning device for learning an assembly operation of components, and a component assembly system having the machine learning device.

2. Description of Related Art

When assembling two components, a screw is engaged into holes formed in the two components in advance (for example, Japanese Unexamined Patent Publication (Kokai) No. 2014-007890). Alternatively, a part of one of the components is inserted into a recessed portion or a through hole of the other component, to assemble the two components.

Such component assembly operations can be automated. When components having relatively small dimensional variations are loaded into assembly devices, the assembly devices can assemble the components at high speed because the positional relationship thereof is constant during assembly. On the contrary, when components having relatively large dimensional variations are loaded into assembly devices, the assembly devices have to assemble the components at low speed with minor positional modification, due to large variations in the positional relationship thereof during assembly, in order to reliably assemble the components.

SUMMARY OF THE INVENTION

However, loading components having large dimensional variations into an assembly device that performs an assembly operation at high speed causes a reduction in component assembly accuracy. Thus, the assembly of the components often fails, and a production line stops frequently. On the other hand, even if components having small dimensional variations are loaded into an assembly device that performs an assembly operation at low speed, the operation speed does not change, thus requiring long operation time.

Therefore, it is desired to provide a machine learning device that can improve component assembly accuracy with a reduction in operation time, and a component assembly device having the machine learning device.

According to a first aspect of the disclosure, a machine learning device learns an assembly operation in which at least one operating machine assembles a first component and a second component to produce an assembly. The machine learning device includes a state observation unit for observing state variables that include at least one of the state of the assembly, a time required to assemble the first component and the second component, and information on a force required to assemble the first component and the second component, the result of a continuity test on the assembly, and at least one of position and posture command values for at least one of the first component and the second component before the assembly operation, and direction, speed and force command values for the assembly operation; and a learning unit for learning, in a related manner, at least one of the state of the assembly, the time required to assemble the first component and the second component, and the information on the force required to assemble the first component and the second component, the result of the continuity test on the assembly, and at least one of the position and posture command values for at least one of the first component and the second component before the assembly operation, and the direction, speed and force command values for the assembly operation, observed by the state observation unit.

The first aspect serves to automatically determine more appropriate position and posture command values for each of the first component and the second component before the assembly operation. Therefore, it is possible to provide a machine learning device that can improve accuracy in assembly of the first component and the second component and reduce operation time, irrespective of dimensional variations in the components.

The objects, features and advantages of the present invention and other objects, features and advantages will be more apparent from the following detailed description of embodiments of the present invention along with accompanying drawings.

DETAILED DESCRIPTION OF THE INVENTION

Embodiments of the present invention will be described below with reference to the accompanying drawings. In the drawings, the same reference numerals indicate the same components. For the sake of easy understanding, the drawings have been modified in scale in an appropriate manner.

Figure 1:
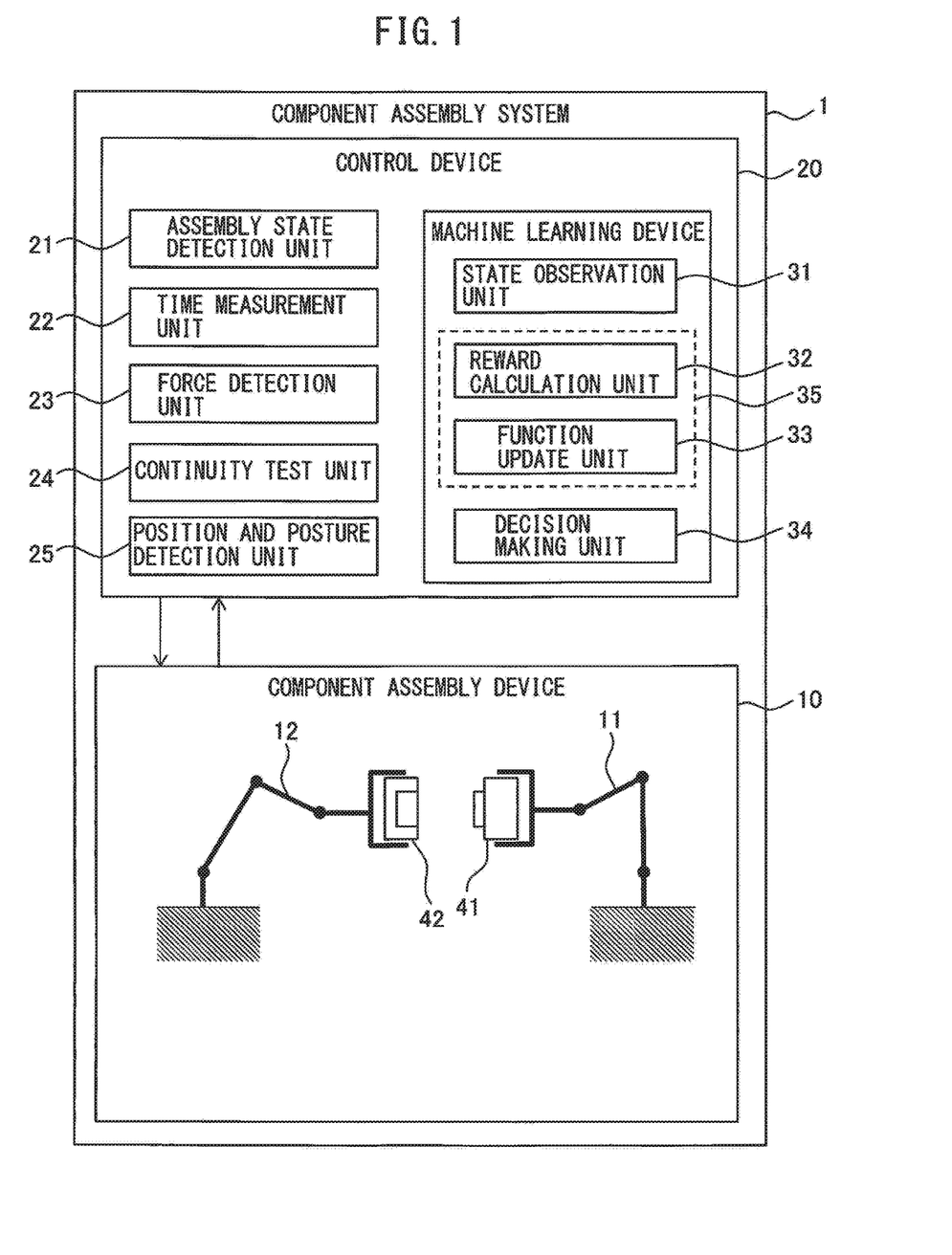
FIG. 1 is a block diagram of a component assembly system according to an embodiment.

FIG. 1 is a block diagram of a component assembly system according to an embodiment. A component assembly system 1 mainly includes a component assembly device 10 and a control device 20 for controlling the component assembly device 10.

The component assembly device 10 includes at least one operating machines 11 and 12. The operating machines 11 and 12 shown in FIG. 1 are, for example, vertical articulated robots, but may be other machines, i.e., simple task machines such as screwers and pressers, or machine tools. In the following description, the operating machines 11 and 12 are assumed to be robots.

The robots 11 and 12 grip a first component 41 and a second component 42, respectively, with their hands. The first component 41 and the second component 42, which can be engaged, are contained in separate containers (not shown). The first component 41 and the second component 42 are engaged with each other into an assembly 40. Note that, a single operating machine (not shown) may assemble the second component 42 with the first component 41 that is secured by a jig or the like.

The robots 11 and 12 grip and retrieve the first component 41 and the second component 42 from the containers (not shown), respectively. After that, the robots 11 and 12 move to positions that are determined by position and posture command values for the robots 11 and 12. In other words, the position and posture command values are command values related to the positions and postures of the first component 41 and the second component 42.

At least one of the robots 11 and 12 moves in accordance with direction, speed and force command values for an assembly operation, and thereby the first component 41 and the second component 42 are assembled. After that, at least one of the robots 11 and 12 returns to the position that is determined by the position and posture command values described above. In this application, a series of operations between the start from the positions determined by the position and posture command values and the return to the positions after performing assembly is referred to as an assembly operation.

Figure 2A:
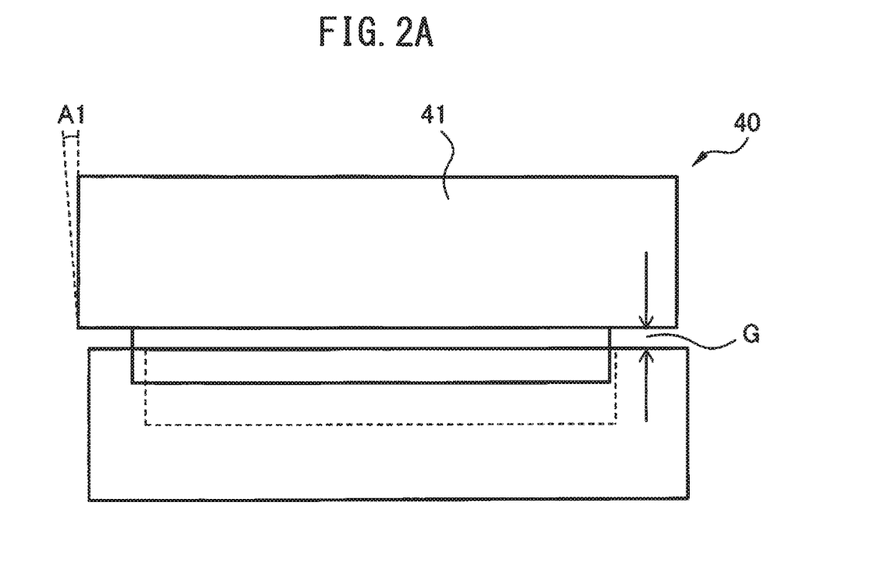
FIG. 2A is a side view of an example of a first component and a second component.
Figure 2B:
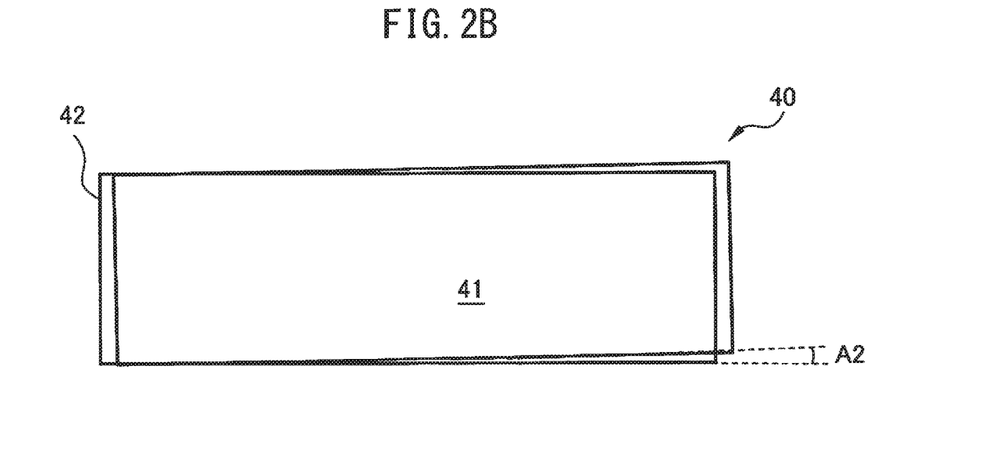
FIG. 2B is a top view of FIG. 2A.
Figure 3A:
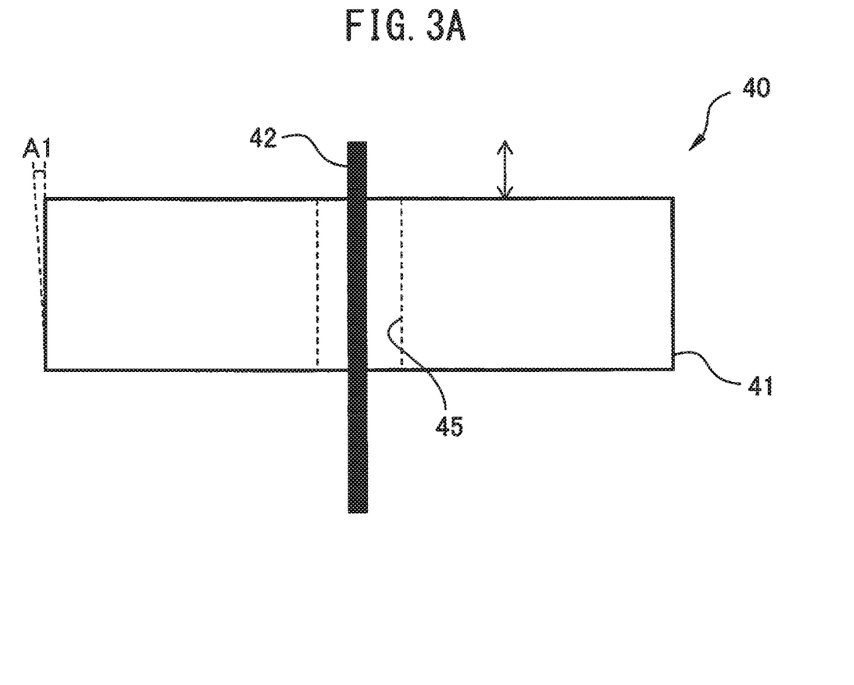
FIG. 3A is a side view of another example of the first component and the second component.

FIG. 2A is a side view of an example of the first component and the second component, and FIG. 2B is a top view of FIG. 2A. As shown in FIG. 2A, both of the first component 41 and the second component 42 are connectors that are engaged. Alternatively, as shown in FIG. 3A, which is a side view of another example of the first component and the second component, and FIG. 3B, which is a top view of FIG. 3A, the first component 41 may be a connector, and the second component 42 may be a pin inserted into a through hole 45 of the connector.

Referring to FIG. 1 again, the control device 20 is a digital computer having a CPU and a data storage unit such as a memory. The control device 20 includes an assembly state detection unit 21 for detecting the state of the assembly 40 into which the first component 41 and the second component 42 are assembled. The assembly state detection unit 21 detects the various states of the assembly 40 based on information from, e.g., a camera or a vision sensor. The states of the assembly 40 include the dimensions of the assembly 40, the positional relationship (including deviation amount) between the first component 41 and the second component 42 in the assembly 40, a gap G, angles A1 and A2 between the first component 41 and the second component 42, the position of the assembly 40 from an arbitrary origin point and the like.

Furthermore, the control device 20 includes a time measurement unit 22, e.g., a timer, for measuring a time T required for the component assembly device 10 to assemble the first component 41 and the second component 42. The time measurement unit 22 measures the time from when the robots 11 and 12 are located in the positions determined by the position and posture command values to when the robots 11 and 12 return to the above-described positions after performing assembly.

The control device 20 further includes a force detection unit 23 for detecting information on a force required to assemble the first component 41 and the second component 42. The force detection unit 23 detects a pressure and the like when engaging the first component 41 and the second component 42, based on information transmitted at certain control intervals from force sensors provided in, e.g., the robots 11 and 12.

The control device 20 further includes a continuity test unit 24 for making a continuity test on the assembly 40. The continuity test is carried out on the assembly 40 after being assembled. When an electric current flowing between the first component 41 and the second component 42 is within a certain range and/or the resistance between the first component 41 and the second component 42 is within a certain range, the continuity test produces a favorable result. For this purpose, the first component 41 and the second component 42 are preferably made of conductive materials.

The control device 20 further includes a position and posture detection unit 25 for detecting the position and posture of at least one of the first component 41 and the second component 42 before the assembly operation. The position and posture detection unit 25 detects the position and posture of at least one of the first component 41 and the second component 42, based on information from a position detector, e.g., an encoder, provided in a motor to drive each axis of the robots 11 and 12.

As shown in FIG. 1, the control device 20 further includes a machine learning device 30. The machine learning device 30 may be provided outside the control device 20. In this case, the machine learning device 30 is connected to the control device 20 and the component assembly device 10 in a communicable manner. The machine learning device 30 determines the direction, speed and force command values to assemble the first component 41 and the second component 42, as well as determines the position and posture command values for at least one of the first component 41 and the second component 42 gripped by the hands of the robots 11 and 12 (these command values may be simply referred to as "command values" below). The command values are contained in operation programs for the robots 11 and 12.

Figure 4:
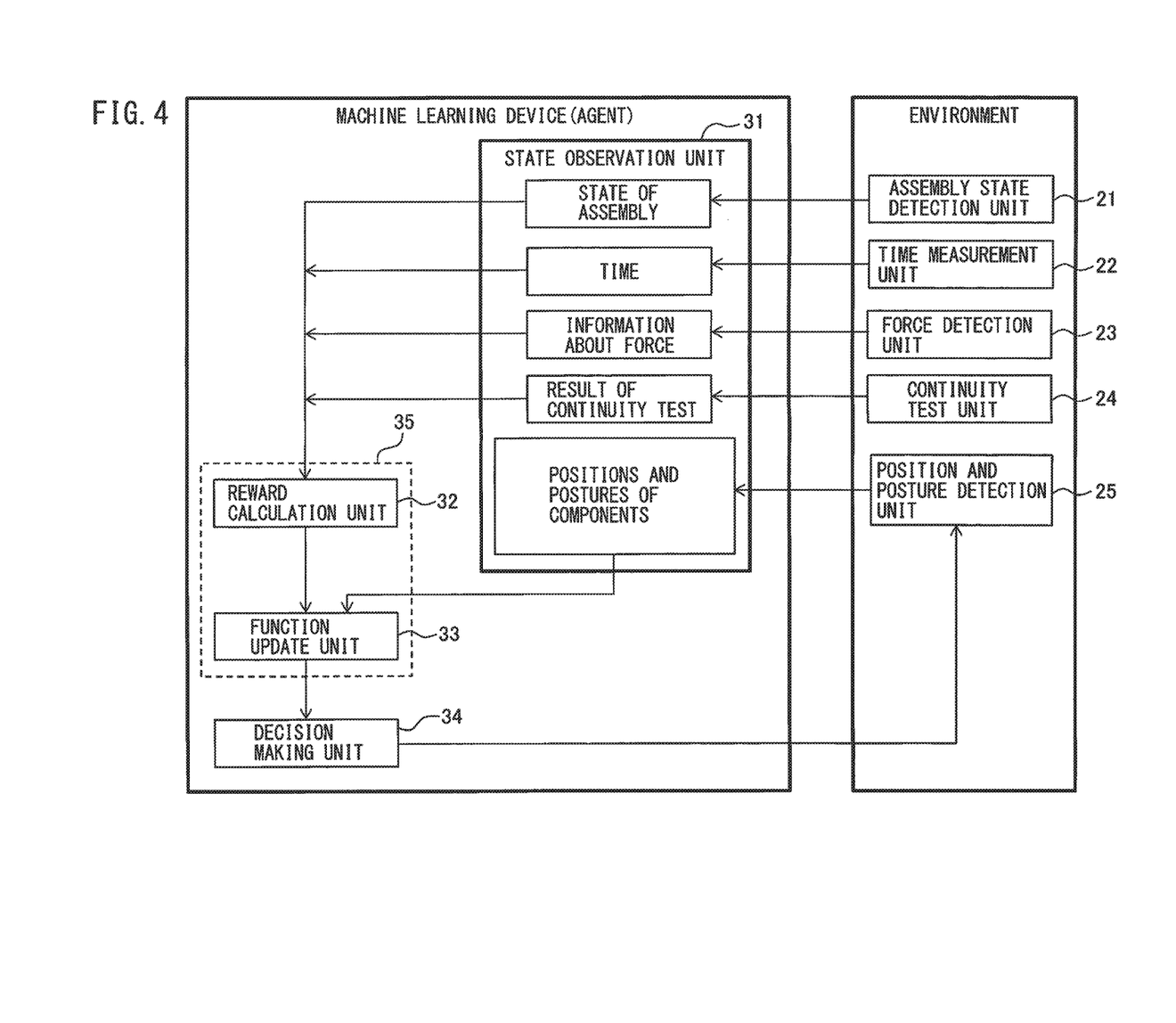
FIG. 4 is an enlarged block diagram of a machine learning device.

Referring to FIG. 4, which shows the machine learning device in an enlarged manner, the machine learning device 30 has a state observation unit 31 for observing state variables that include at least one of the state of the assembly 40 into which the first component 41 and the second component 42 are assembled, the time required to assemble the first component 41 and the second component 42, and the information on the force required to assemble the first component 41 and the second component 42, the result of the continuity test on the assembly 40, and at least one of the position and posture command values for at least one of the first component 41 and the second component 42 before the assembly operation, and the direction, speed and force command values for the assembly operation. The state observation unit 31 sequentially stores the state variables in the data storage unit such as the memory, together with observation time.

Furthermore, the machine learning device 30 has a learning unit 35 for learning, in a related manner, at least one of the state of the assembly 40, the time required to assemble the first component 41 and the second component 42, and the information on the force required to assemble the first component 41 and the second component 42, the result of the continuity test on the assembly 40, and at least one of the position and posture command values for the position and posture of at least one of the first component 41 and the second component 42 before the assembly operation, and the direction, speed and force command values for the assembly operation, observed by the state observation unit 31.

The learning unit 35 can use various machine learning algorithms such as supervised learning, unsupervised learning, semi-supervised learning, reinforcement learning, transduction, multi-task learning and the like. In the following description, the learning unit 35 performs reinforcement learning using Q-learning.

Referring to FIG. 4, the machine learning device 30 corresponds to an agent in reinforcement learning. The assembly state detection unit 21, the time measurement unit 22, the force detection unit 23, the continuity test unit 24, and the position and posture detection unit 25 detect the state of an environment.

The learning unit 35, which performs reinforcement learning, includes a reward calculation unit 32 and a function update unit 33. The reward calculation unit 32 calculates a reward based on at least one of the state of the assembly 40, the time required to assemble the first component 41 and the second component 42, and the information on the force required to assemble the first component 41 and the second component 42, and the result of the continuity test on the assembly 40, observed by the state observation unit 31. The function update unit 33 updates a function, e.g., an action value function (action value table), that determines at least one of the position and posture command values for at least one of the first component 41 and the second component 42 before the assembly operation, and the direction, speed and force command values for the assembly operation, from the state variables at present based on the reward calculated by the reward calculation unit 32. As a matter of course, the function update unit 33 may update another function.

The machine learning device 30 further includes a decision making unit 34 that determines an optimal value of at least one of the position and posture command values for at least one of the first component 41 and the second component 42 before the assembly operation and the direction, speed and force command values for the assembly operation, from the state variables at present based on a learning result of the learning unit 35. The decision making unit 34 learns selection (decision making) of a better action. The decision making unit 34 may be included in the control device 20, instead of in the machine learning device 30.

Figure 5:
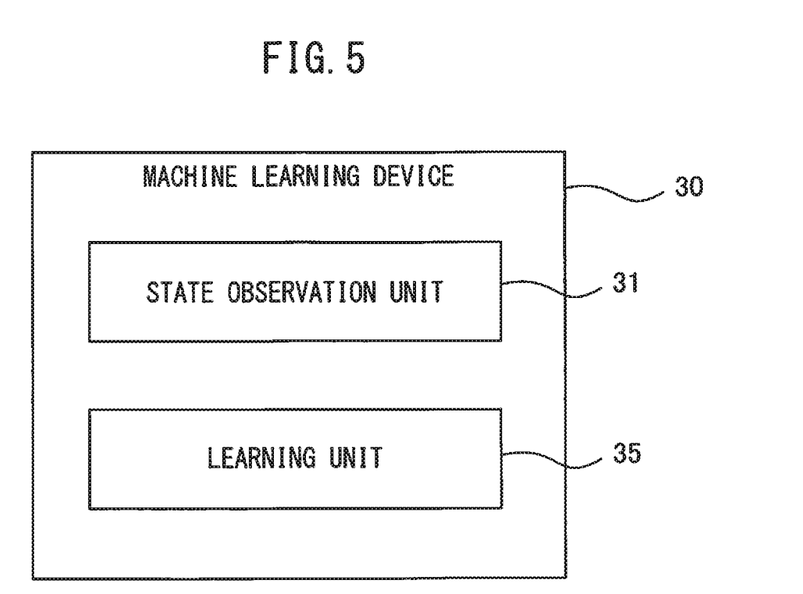
FIG. 5 is a block diagram of a machine learning device according to another embodiment.

Note that, as shown in FIG. 5, which is a block diagram of a machine learning device according to another embodiment, a machine learning device 30 may include only the state observation unit 31 and the learning unit 35.

Figure 6:
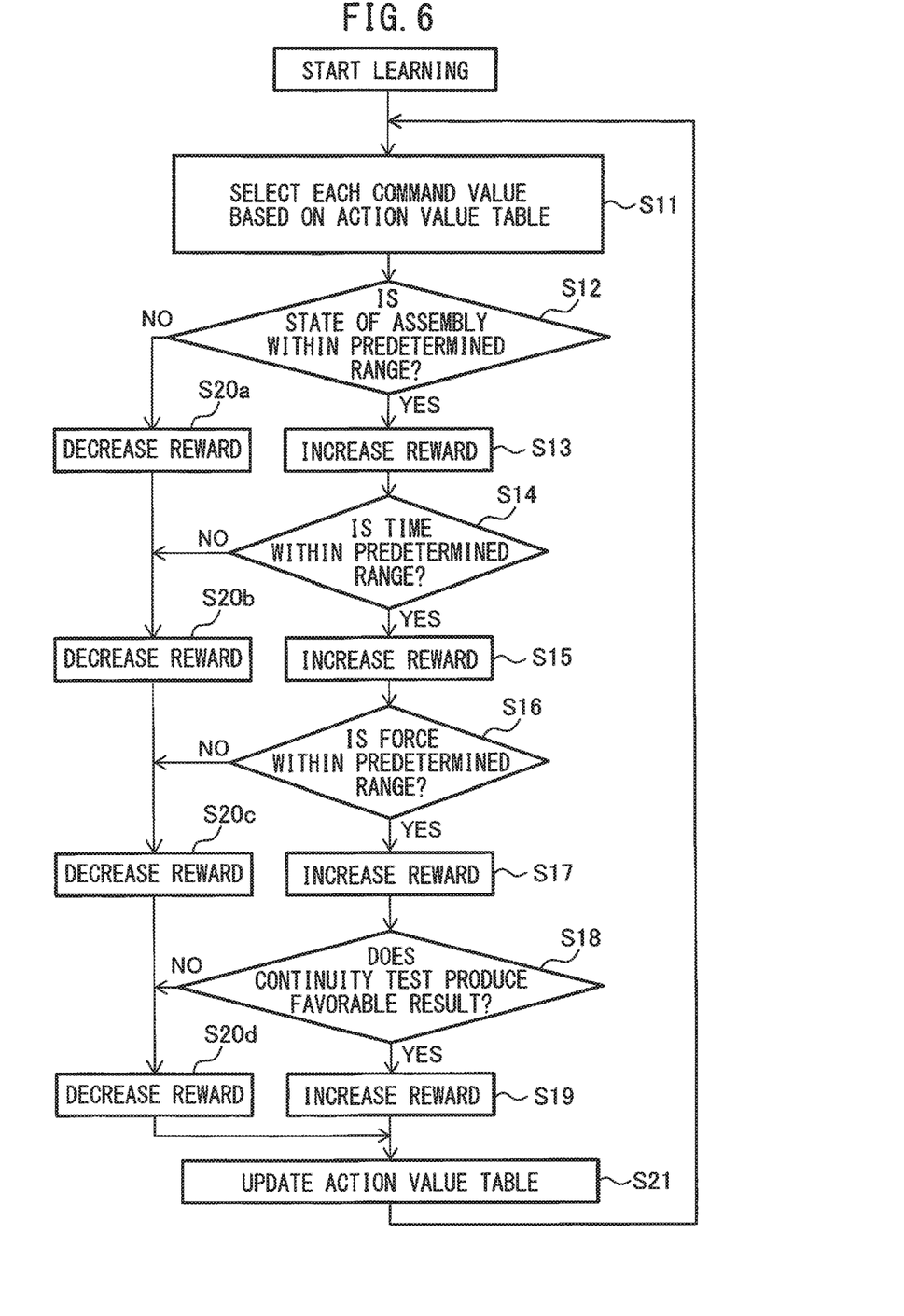
FIG. 6 is a flowchart of the operation of the machine learning device.

FIG. 6 is a flowchart of the operation of a machine learning device. The operation of the machine learning device 30 will be described with reference to FIGS. 1 to 6. The operation of FIG. 6 is performed whenever the robots 11 and 12 gripping a first component 41 and a second component 42, respectively, assemble the first component 41 and the second component 42.

First, in step S11, in addition to selecting position and posture command values for at least one of the first component 41 and the second component 42 before an assembly operation, direction, speed and force command values are selected to assemble the first component 41 and the second component 42. The command values are each selected at random from respective predetermined ranges.

Alternatively, as to e.g. the position command value of the first component 41, a minimum value may be initially selected within the predetermined range, and a slightly increased value may be selected in the next cycle. The same is true for the other command values. The process of FIG. 6 may be repeated so as to select all combinations of the position and posture command values for at least one of the first component 41 and the second component 42 before the assembly operation and the direction, speed and force command values to assemble the first component 41 and the second component 42.

At least one of the robots 11 and 12 is operated based on the position and posture command values, so the first component 41 and the second component 42 are placed in positions determined by the position and posture command values. Then, the first component 41 and the second component 42 are assembled into an assembly 40 based on the direction, speed and force command values for the assembly operation. At the end, the robots 11 and 12 are returned to the positions determined by the position and posture command values. At this time, a hand of at least one of the robots 11 and 12 releases the assembled components 41 and 42. Note that, the direction, speed and force command values for the assembly operation may be issued to only one of the robots 11 and 12.

Then, in step S12, the assembly state detection unit 21 detects the various states of the assembly 40, for example, the dimensions of the assembly 40, the positional relationship between the first component 41 and the second component 42 in the assembly 40, a gap, angles A1 and A2 between the first component 41 and the second component 42 and the position of the assembly 40 from an arbitrary origin point, and compares the various states with respective predetermined ranges.

When the various states of the assembly 40 are within the respective predetermined ranges in step S12, the reward increases in step S13. On the other hand, the various states of the assembly 40 are out of the respective predetermined ranges in step S12, the reward decreases or remains unchanged in step S20a. Steps S12, S13 and S20a are preferably performed as to each of the various states of the assembly 40.

Then, in step S14, the time measurement unit 22 determines whether or not the measurement time from when the robots 11 and 12 are located in the positions determined by the position and posture command values to when the robots 11 and 12 return to the positions after performing the assembly operation is within a predetermined time range. When the measurement time is within the predetermined time range, the reward increases in step S15. When the measurement time is out of the predetermined time range, the reward decreases or remains unchanged in step S20b.

Then, in step S16, whether or not an assembly force measured by the force detection unit 23 is within a predetermined force range is determined. When the assembly force is within the predetermined force range, the reward increases in step S17. When the assembly force is out of the predetermined force range, the reward decreases or remains unchanged in step S20c.

Then, in step S18, whether or not a continuity test performed by the continuity test unit 24 produces a favorable result is determined. To be more specific, it is determined that whether or not an electric current having flowed during the continuity test and the assembly 40 during the continuity test are within respective predetermined ranges, and whether or not the response of a signal is normal. When the continuity test produces a favorable result, the reward increases in step S19. When the continuity test produces an unfavorable result, the reward decreases or remains unchanged in step S20d.

The reward calculation unit 32 calculates the increase or decrease of the reward. The reward may increase or decrease by different amounts depending on the steps. At least one of the determination steps S12, S14, S16 and S18 and the reward step related thereto may be omitted.

After that, in step S21, the function update unit 33 updates an action value function. Q-learning performed by the learning unit 35 is a method for learning a value (the value of an action) Q(s, a) for selecting an action "a" in a certain environment state "s". Consequently, an action "a" having the highest Q(s, a) is selected in a certain state "s". In Q-learning, various actions "a" are performed in a certain state "s", and a correct Q(s, a) is learned through trial and error using rewards provided at that time. The following Equation (1) represents an update equation for the action value function Q(s, a):

$$Q(s_t, a_t) \leftarrow Q(s_t, a_t) + \alpha \left( r_{t+1} + \gamma \max_a Q(s_{t+1}, a) - Q(s_t, a_t) \right)$$

where, $s_t$ and $a_t$ represent an environment and an action, respectively, at a time t. By executing the action $a_t$, the environment changes to $s_{t+1}$, and a reward $r_{t+1}$ is calculated by the change of the environment. A term with "max" represents the product of a Q value, when an action "a" having the highest Q value (that has been known at that time) is selected in the environment $s_{t+1}$, and γ. "γ" is a discount factor in the range of $0<\gamma \leq 1$ (usually, 0.9 to 0.99), and "α" is a learning rate in the range of $0<\alpha \leq 1$ (usually, in the order of 0.1).

This update equation indicates that, as compared with an evaluation value $Q(s_t, a_t)$ of an action "a" in a state "s", if an evaluation value $Q(s_{t+1}, \max a_{t+1})$ of an optimal action in the next environmental state derived from the action "a" is higher, $Q(s_t, a_t)$ is increased. If not, $Q(s_t, a_t)$ is decreased. In short, the value of an action in a certain state is approximated to an optimal action value in the next state. In other words, the learning unit 35 updates an optimal value of at least one of the position and posture command values for at least one of the first component 41 and the second component 42 before an assembly operation and the direction, speed and force command values for the assembly operation.

As described above, in step S21, the function update unit 33 updates the action value function using equation (1). After that, the operation returns to step S11, and in addition to selecting position and posture command values for at least one of the first component 41 and the second component 42 before an assembly operation, direction, speed and force command values for the assembly operation are selected. The action value function is updated in the same manner. Note that, an action value table may be updated instead of the action value function.

In reinforcement learning, the learning unit 35 as an agent determines an action based on the state of an environment. In this case, the action means that the decision making unit 34 selects new values as the various command values to perform the action in accordance with the new values. The new values of the various command values change the environment shown in FIG. 4, e.g., at least one of the position and posture command values for at least one of the first component 41 and the second component 42 before an assembly operation and the direction, speed and force command values for the assembly operation. In accordance with the change in the environment, the machine learning device 30 is provided with a reward, as described above, and the decision making unit 34 of the machine learning device 30 learns selection of a better action (decision making) so as to obtain, for example, a higher reward.

Thus, repetition of the operation shown in FIG. 6 many times increases the reliability of the action value function. Therefore, it becomes possible in step S11 to select the position and posture command values for at least one of the first component 41 and the second component 42 before an assembly operation and the direction, speed and force command values for the assembly operation based on the reliable action value function so as to increase, e.g., the Q value, thus allowing an optimal determination of more appropriate dimensional command values and the like.

Therefore, it is possible to automatically use the contents updated by the function update unit 33 of the machine learning device 30 as the position and posture command values for at least one of the first component 41 and the second component 42 before the assembly operation and the direction, speed and force command values for the assembly operation. Introducing the machine learning device 30 into the control device 20 allows automatic adjustment of the command values. Thus, it is possible to automatically smooth out dimensional variations in the first component 41 and the second component 42. Therefore, the first component 41 and the second component 42 are assembled with improved accuracy, irrespective of the dimensional variations in the components. Learning results of the machine learning device eliminate the need for an operator to provide command values manually. Therefore, it is possible to reduce assembly time, and as a result, improve production efficiency.

A function that is approximated using a neural network, which is described later, may be used as the action value function. In this case, the state variables observed by the state observation unit 31 may be computed in a multilayer structure, to update the action value function in real time. This provides more appropriate learning results. This method has a significant advantage for data having enormous amounts of "s" and "a" data, such as image data.

The machine learning device 30 and the like shown in FIG. 4 will be described again in detail, though the descriptions partly overlap. The machine learning device 30 has the function of learning knowledge, as well as the functions of extracting useful rules, knowledge representations, criteria, and the like from a data group inputted to the device by analysis, and outputting determination results. There are various methods therefor, which are broadly divided into "supervised learning", "unsupervised learning" and "reinforcement learning". Moreover, when realizing these methods, a method called "deep learning" is used for learning the extraction of features themselves.

In "supervised learning", a large amount of data pairs of an input and a result (label) are provided to the learning device. The machine learning device learns features from the data set, and heuristically obtains a model to predict a result from an input, i.e., the relationship therebetween. "Supervised learning" can be realized using an algorithm such as a neural network described later.

In "unsupervised learning", a large amount of input data only is provided to the machine learning device. The machine learning device learns the distribution of the input data and applies compression, classification, alignment, and the like to the input data, without being provided with corresponding output data as supervisors. The features of the data set can be clustered or the like based on their similarity. With the use of these results, while providing a certain criterion, an output is assigned so as to optimize the criterion, and this allows a prediction of the output. There is also a method called "semi-supervised learning" as an intermediate problem setting between "supervised learning" and "unsupervised learning", in which a part of the data includes pairs of an input and an output while the other includes only inputs. In this embodiment, data that can be obtained without actually operating the component assembly device 10 is used in unsupervised learning, in order to improve learning efficiency.

In "reinforcement learning", problems are set as follows.
The control device observes an environment state and determines an action.
The environment varies in accordance with some rule, and an action itself sometimes varies the environment.
A reward signal returns whenever an action is performed.
The aim is to maximize a total (discounted) reward in the future.
Learning is started from a state in which a result brought on by an action is not know or is insufficiently known. The result is obtained as data, only after the component assembly device 10 is actually operated. In other words, it is necessary to search for an optimal action through trial and error.
Learning may be started from a good start point by performing prior learning (using the above-described supervised learning or inverse reinforcement learning method) so as to mimic the action of a human in an initial state.

"Reinforcement learning" is a method for learning optimal actions based not only on determining and classifying, but also on the interactions between an action and an environment by learning actions, i.e., a learning method to maximize a total reward obtained in the future. In this embodiment, this indicates that actions having an effect on the future can be obtained. The following description takes Q-learning as an example, but is not limited thereto.

Q-learning is a method for learning a value Q(s, a) of selecting an action "a" in a certain environment state "s". In other words, in a certain state "s", an action "a" having the highest value of Q(s, a) is selected as an optimal action. However, as to a combination of a state "s" and an action "a", a correct value of Q(s, a) is initially not known at all. Thus, an agent (a subject of an action) chooses various actions "a" in a certain state "s", and is provided with a reward for each action "a". Therefore, the agent learns to select a better action, i.e., a correct value of Q(s, a).

The aim is to maximize a total reward to be obtained in the future, i.e., to obtain $Q(s, a)=E[\Sigma \gamma^t r_t]$, as a result of actions (an expected value is taken when a state changes in accordance with optimal actions; the optimal actions have not been known, as a matter of course, and hence have to be found while learning). For example, an update equation for such a value Q(s, a) is represented as follows (same as above equation (1)):

$$Q(s_t, a_t) \leftarrow Q(s_t, a_t) + \alpha \left( r_{t+1} + \gamma \max_a Q(s_{t+1}, a) - Q(s_t, a_t) \right)$$

where $s_t$ represents an environment state at a time t, and $a_t$ represents an action at the time t. By executing the action $a_t$, the state changes to $s_{t+1}$. "$r_{t+1}$" represents a reward provided by the state change. A term with "max" represents the product of a Q value, when an action "a" having the highest Q value that has been known at that time is selected in the state $s_{t+1}$, and γ. "γ" is a parameter of $0<\gamma \leq 1$ called discount factor. "α" is a learning rate in the range of $0<\alpha \leq 1$.

This equation indicates a method for updating an evaluation value Q ($s_t$, $a_t$) of an action $a_t$ in a state $s_t$ based on a reward $r_{t+1}$ that has returned as a result of the action $a_t$. This update equation indicates that, as compared with an evaluation value Q($s_t$, $a_t$) of an action "a" in a state "s", if an evaluation value Q($s_{t+1}$, max $a_{t+1}$) of an optimal action "max a" in the next state derived from a reward $r_{t+1}$ plus the action "a" is higher, Q($s_t$, $a_t$) is increased. If not, Q($s_t$, $a_t$) is decreased. In other words, the value of an action in a certain state is approximated to an optimal action value in the next state that is derived from a reward returning immediately as a result of the action and the action itself.

There are two methods for representing Q(s, a) in a computer, that is, a method in which the Q values of all state-action pairs (s, a) are retained in a table (action value table) and a method in which a function for approximating Q(s, a) is prepared. In the latter method, the above-described update equation can be realized by adjusting a parameter for an approximation function using a stochastic gradient descent method or the like. As the approximation function, a neural network is usable as described later.

Figure 7:
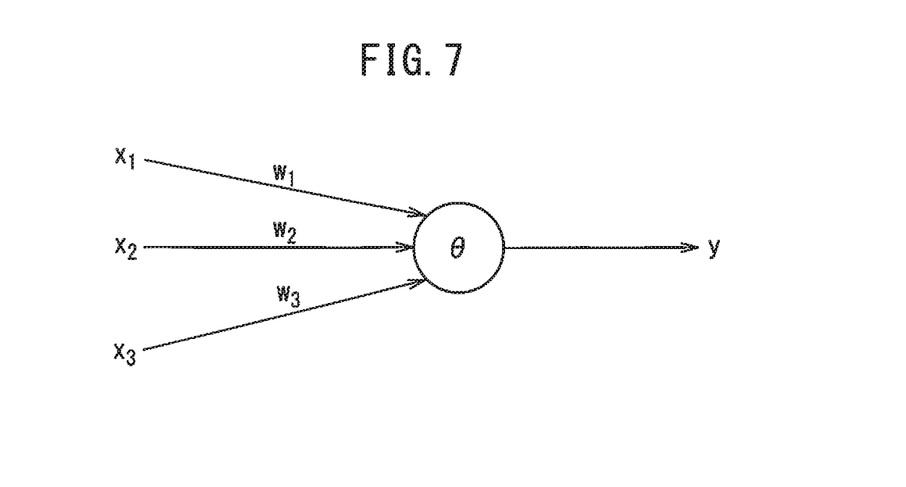
FIG. 7 is a schematic diagram of a neuron model.

As an approximation algorithm for a value function in supervised learning, unsupervised learning and reinforcement learning, a neural network is usable. The neural network is constituted of, for example, an arithmetic unit, memory, and the like that imitate a neuron model as shown in FIG. 7. FIG. 7 is a schematic diagram of a neuron model.

As shown in FIG. 7, a neuron produces an output y in response to a plurality of inputs x (for example, inputs $x_1$ to $x_3$). Each of the inputs $x_1$ to $x_3$ is applied with a weight w ($w_1$ to $w_3$) corresponding to the input x. Thus, the neuron produces the output y represented by the following equation. Note that, all of the input x, the output y and the weight w are vectors.

$$y=f_k(\Sigma_{i=1}^n x_i w_i - \theta)$$

where θ is a bias, and $f_k$ is an activation function.

Figure 8:
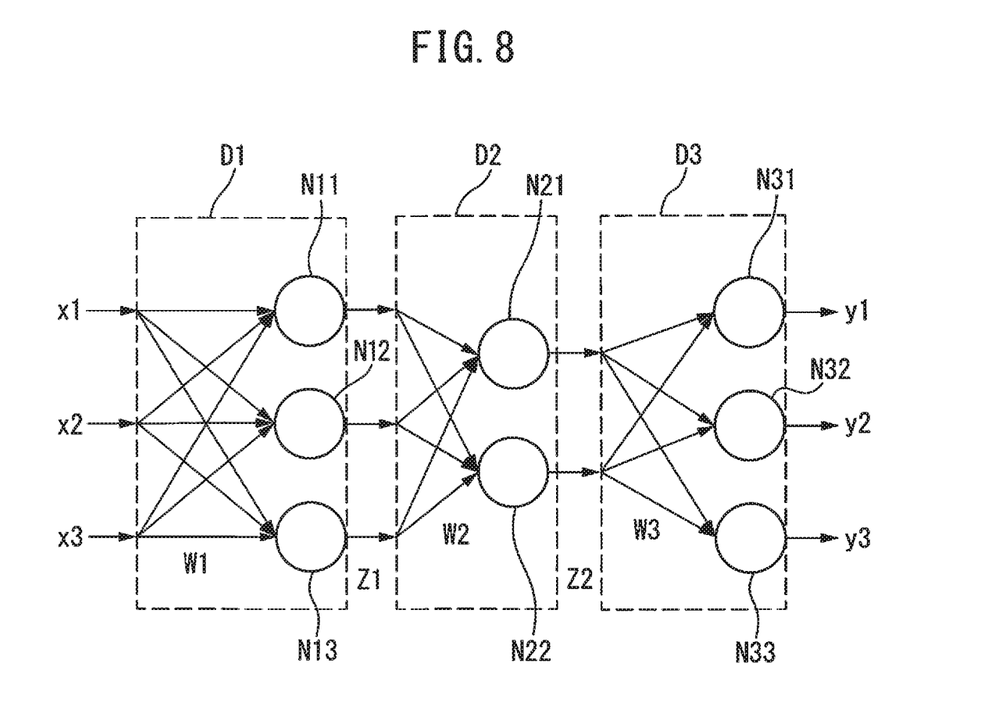
FIG. 8 is a schematic diagram of a three-layer neural network model.

Then, a three-layer neural network having weights of three layers, which is constituted of a combination of the above-described neurons, will be described with reference to FIG. 8. FIG. 8 is a schematic diagram of a neural network having weights of three layers D1 to D3.

As shown in FIG. 8, a plurality of inputs x (for example, inputs x1 to x3) are inputted from the left of the neural network, and a result y (for example, results y1 to y3) is outputted from the right thereof.

To be more specific, the inputs x1 to x3 are inputted to each of the three neurons N11 to N13 while being weighted correspondingly. The weights applied to the inputs are collectively indicated by w1.

The neurons N11 to N13 output vectors z11 to z13, respectively. The vectors z11 to z13 are collectively indicated by a feature vector z1, which is regarded as a vector that extracts a feature amount from the input vector. The feature vector z1 is a feature vector between the weight w1 and a weight w2.

The vectors z11 to z13 are inputted to each of two neurons N21 and N22 while being weighted correspondingly. The weights applied to the feature vectors are collectively indicated by w2.

The neurons N21 and N22 output vectors z21 and z22, respectively. The vectors z21 and z22 are collectively indicated by a feature vector z2. The feature vector z2 is a feature vector between the weight w2 and a weight w3.

The feature vectors z21 and z22 are inputted to each of three neurons N31 to N33 while being weighted correspondingly. The weights applied to the feature vectors are collectively indicated by w3.

Finally, the neurons N31 to N33 output results y1 to y3, respectively.

The neural network has a learning mode and a value prediction mode. In the learning mode, the weight w is learned using a learning data set. In the value prediction mode, the action of the component assembly device 10 is determined through the use of the parameter (the word of "prediction" is used for the sake of convenience, but various tasks including detection, classification, inference, and the like can be performed).

In the value prediction mode, data that has been obtained by actual operation of the component assembly device 10 may be immediately learned and reflected in the next action (on-line learning). Alternatively, learning may be collectively performed using a data group collected in advance, and a detection mode may be performed thereafter using the parameter (batch learning). In an intermediate manner, the learning mode may be performed whenever a certain amount of data is accumulated.

The weights w1 to w3 can be learned using an error back propagation algorithm (backpropagation algorithm). Information on an error enters from the right and propagates to the left. The error back propagation algorithm is a method in which each weight is adjusted (learned) with respect to each neuron so as to minimize the difference between an output y and an actual output y (supervisor) in response to an input x.

Such a neural network may have layers of more than three (called deep learning). An arithmetic unit that performs feature extraction from inputs in stages and regression of results can be automatically acquired only from supervisor data.

Accordingly, in order to perform Q-learning described above, as shown in FIG. 4, the machine learning device 30 according to this embodiment includes the state observation unit 31, the learning unit 35 and the decision making unit 34. However, a machine learning method applicable to the present invention is not limited to Q-learning. For example, in the instance of applying supervised learning, a value function corresponds to a learning model, and a reward corresponds to an error.

Figure 9:
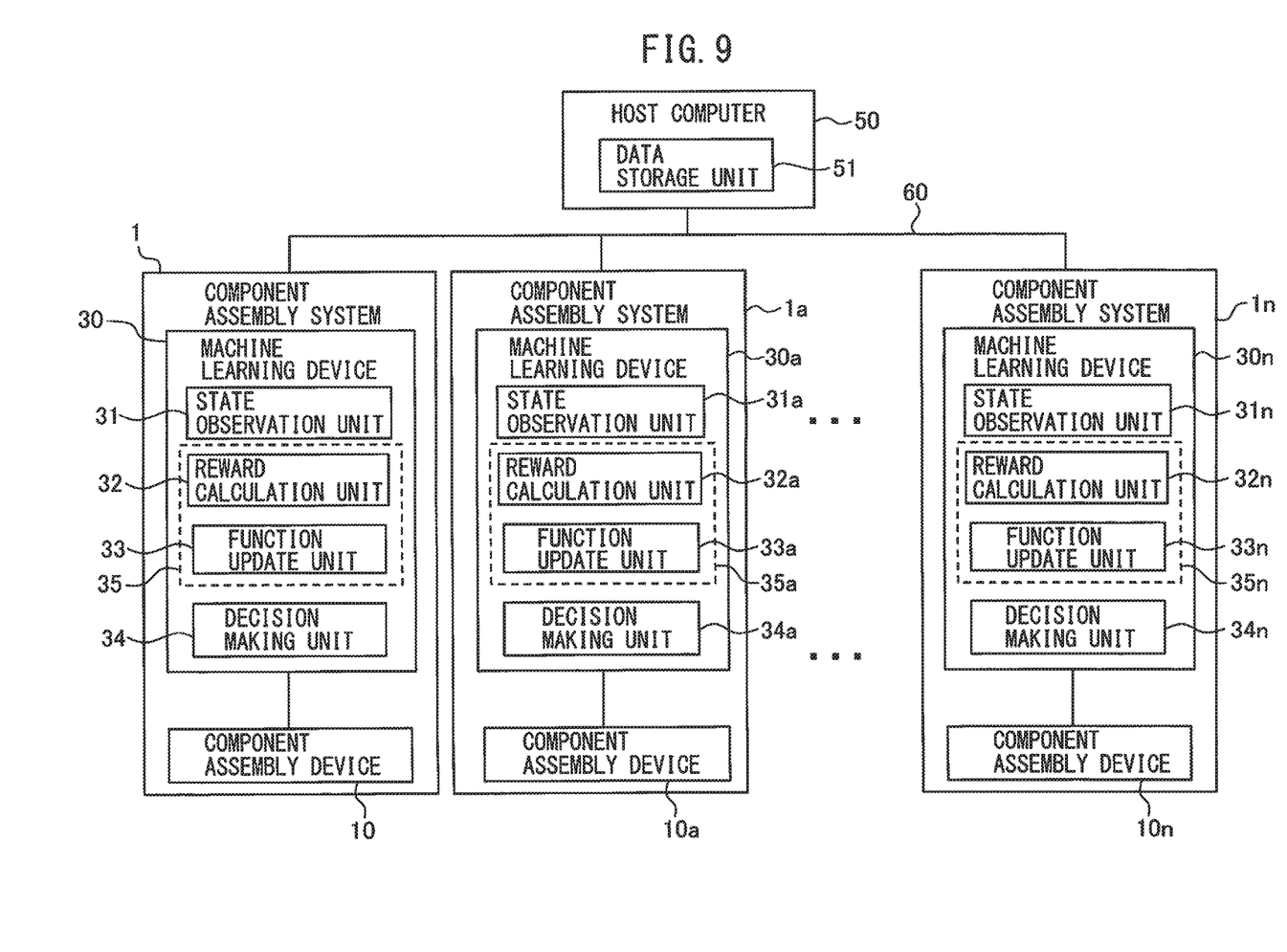
FIG. 9 is a block diagram of a plurality of component assembly systems according to yet another embodiment.

FIG. 9 is a block diagram of a plurality of component assembly systems according to yet another embodiment. FIG. 9 shows a plurality of component assembly systems 1 and 1a to 1n. The component assembly systems 1 and 1a to 1n include machine learning devices 30 and 30a to 30n, respectively. The machine learning devices 30 and 30a to 30n include state observation units 31 and 31a to 31n and the like, respectively, as described above. As is apparent from FIG. 9, the component assembly systems 1 and 1a to 1n are connected to each other through a communication unit 60. The communication unit 60 is a wired or wireless network.

By performing machine learning in a repeated manner, various command values are stored in the state observation unit 31 of the component assembly system 1. In the same manner, the machine learning device 30 of the component assembly system 1 stores learning results (functions and the like).

Thus, for example, even when the machine learning device 30a of the component assembly system 1a does not perform machine learning, the command values and the learning results of the component assembly system 1 can be incorporated into the state observation unit 31a and the like of the component assembly system 1a through the communication unit 60. Therefore, the machine learning device 30a of the component assembly system 1a can use the reliable learning results and the like, without actually performing machine learning. The same is true for the other component assembly systems 1n and the like.

Furthermore, in FIG. 9, a host computer 50, e.g., a server, having a data storage unit 51 is wiredly or wirelessly connected to the communication unit 60. Note that, the host computer 50 may be directly connected to, for example, one of the component assembly systems 1 and 1a to 1n.

The command values, the learning results and the like stored in the state observation unit 31 of the component assembly system 1 may be stored in the data storage unit 51 of the host computer 50 through the communication unit 60. In this case, the component assembly system 1a accesses the data storage unit 51 of the host computer 50, to incorporate the command values, the learning results and the like into the machine learning device 30a. In other words, even if the component assembly system 1 is temporarily disconnected from the network, the other component assembly system 1a can obtain the command values, the learning results, and the like.

Figure 3B:
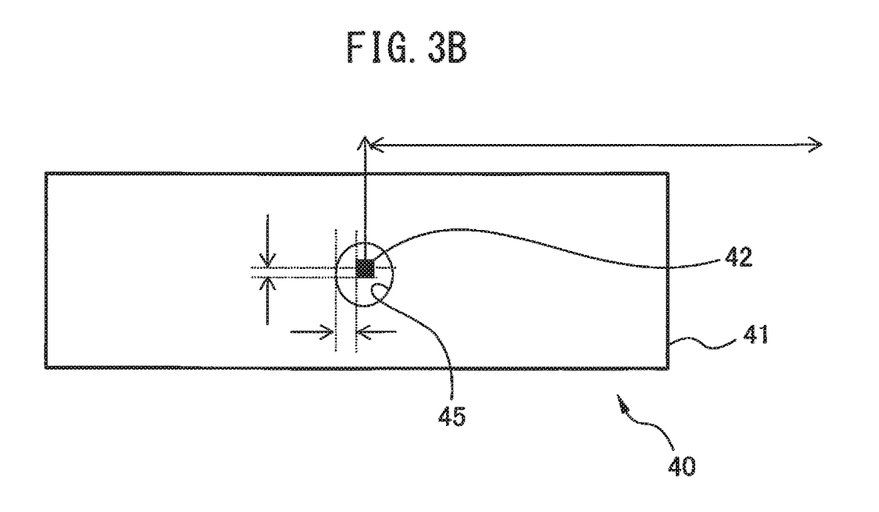
FIG. 3B is a top view of FIG. 3A.

Note that, when the first component 41 is a connector and the second component 42 is a pin, as described with reference to FIGS. 3A and 3B, the state of the assembly 40 may include the protrusion amount of the pin 42 from an end surface of the connector 41 and the positional relationship between the through hole 45 and the pin 42. The protrusion amount and the like are compared with respective predetermined ranges in step S12 of FIG. 6, and the operation proceeds in the same manner.

Figure 10A:
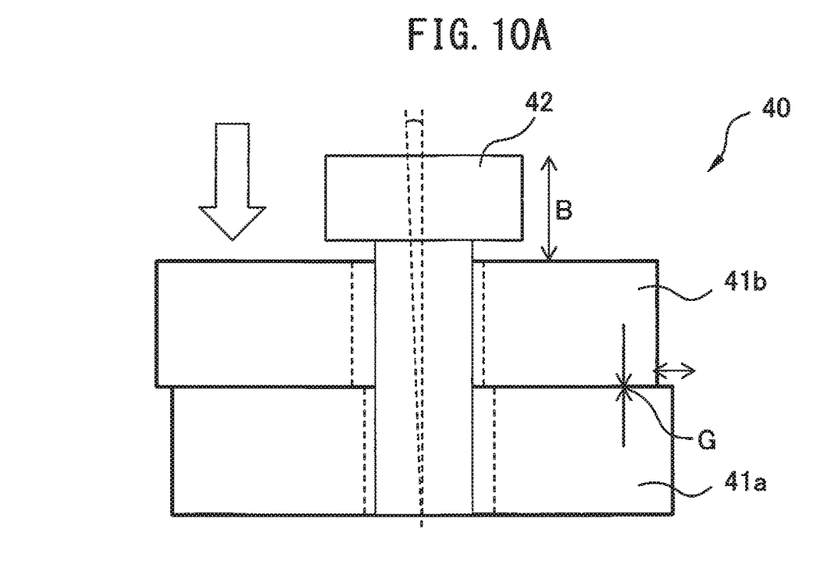
FIG. 10A is a side view of the first component and the second component according to yet another example.
Figure 10B:
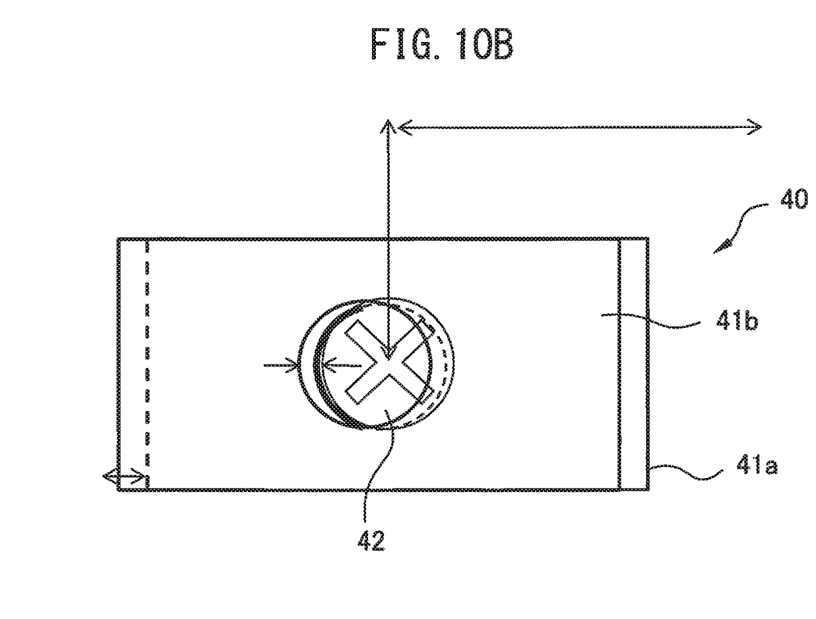
FIG. 10B is a top view of FIG. 10A.

FIG. 10A is a side view of the first component and the second component according to yet another example, and FIG. 10B is a top view of FIG. 10A. FIGS. 10A and 10B show plates 41a and 41b in which through holes having screw threads are formed. A screw 42 is engaged with the screw threads to form an assembly 40.

In this case, the two plates 41a and 41b that are gripped in a state of being overlaid onto each other correspond to a first component 41 gripped by the robot 11. The screw 42, i.e., the second component 42, is engaged by another operating machine or the robot 12.

In this embodiment, before an assembly operation, the first component 41 constituted of the two plates 41a and 41b may be observed. In other words, the positional relationship (including deviation amount) between the plates 41a and 41b, the positional relationship between each through hole and the screw 42, a gap G, the protrusion amount B of the screw 42, the position of the assembly 40 from an arbitrary origin point and the like may be detected using, e.g., a camera or a vision sensor. The detected values may be inputted to the state observation unit 31, and the learning unit 35 may perform learning based on the detected values, as described above. Furthermore, the above-described information on a force includes a torque for engaging the screw 42. The torque is compared with a predetermined torque range in step S16 of FIG. 6, and the operation proceeds in the same manner.

As described above, the first component 41 and the second component 42 are not limited to the components illustrated in the drawings, but include various types of components that can be engaged with each other. The scope of the present invention includes such cases.

Aspects of the Disclosure

A first aspect provides a machine learning device (30) that learns an assembly operation in which at least one of operating machines (11 and 12) assembles a first component (41) and a second component (42) to produce an assembly (40). The machine learning device (30) includes a state observation unit (31) for observing state variables that include at least one of the state of the assembly, a time required to assemble the first component and the second component, and information on a force required to assemble the first component and the second component, the result of a continuity test on the assembly, and at least one of position and posture command values for at least one of the first component and the second component before the assembly operation, and direction, speed and force command values for the assembly operation; and a learning unit (35) for learning, in a related manner, at least one of the state of the assembly, the time required to assemble the first component and the second component, and the information on the force required to assemble the first component and the second component, the result of the continuity test on the assembly, and at least one of the position and posture command values for at least one of the first component and the second component before the assembly operation, and the direction, speed and force command values for the assembly operation, observed by the state observation unit.

According to a second aspect, in the first aspect, the learning unit includes a reward calculation unit (32) for calculating a reward based on at least one of the state of the assembly, the time required to assemble the first component and the second component, and the information on the force required to assemble the first component and the second component, and the result of the continuity test on the assembly, observed by the state observation unit; and a function update unit (33) for updating a function to determine at least one of the position and posture command values for at least one of the first component and the second component before the assembly operation and the direction, speed and force command values for the assembly operation, from the state variables at present based on the reward calculated by the reward calculation unit.

According to a third aspect, in the first or second aspect, the machine learning device further includes a decision making unit (34) for determining an optimal value of at least one of the position and posture command values for at least one of the first component and the second component before the assembly operation and the direction, speed and force command values for the assembly operation, from the state variables at present based on the learning result of the learning unit.

According to a fourth aspect, in any one of the first to third aspects, the reward calculation unit increases the reward when the state of the assembly, the time required to assemble the first component and the second component, and the information on the force required to assemble the first component and the second component, observed by the state observation unit, are within respective allowable ranges, while the reward calculation unit decreases the reward when the state of the assembly, the time required to assemble the first component and the second component, and the information on the force required to assemble the first component and the second component are out of the respective allowable ranges. Furthermore, the reward calculation unit increases the reward when the continuity test on the assembly produces a favorable result, while the reward calculation unit decreases the reward when the continuity test on the assembly produces an unfavorable result.

According to a fifth aspect, in any one of the first to fourth aspects, the learning unit computes the state variables observed by the state observation unit in a multilayer structure, and updates the function in real time.

According to a sixth aspect, in any one of the first to fifth aspects, the function update unit updates the function using a function updated by a function update unit of another machine learning device.

A seventh aspect provides a component assembly system (1) including the machine learning device according to any one of first to sixth aspects.

Effects of Aspects

The first to third aspects serve to automatically determine more appropriate position and posture command values for each of the first component and the second component before the assembly operation, thus allowing an improvement in accuracy in assembly of the first component and the second component, and a reduction in operation time.

The fourth aspect facilitates more appropriate determination of the reward.

The fifth aspect facilitates obtaining the appropriate learning result.

According to the sixth aspect, the learning result of a certain machine learning device is incorporated into another machine learning device, to share reliable learning results and the like.

The seventh aspect automatically smooths out dimensional variations in the first component and the second component. Using the learning results of the machine learning device eliminates the need for an operator to manually adjust the positions and the like of the components. Therefore, it is possible to reduce the assembly time of the first component and the second component.

The present invention is described using typical embodiments, but it is apparent for those skilled in the art that, in addition to the modifications described above, various other modifications, omissions and additions can be made within the scope of the present invention.

What is claimed is:

1. A machine learning device for learning an assembly operation in which at least one operating machine assembles a first component and a second component to produce an assembly, the machine learning device comprising:
   a state observation unit for observing state variables that include at least one of the state of the assembly, a time required to assemble the first component and the second component, and information on a force required to assemble the first component and the second component, the result of a continuity test on the assembly, and at least one of position and posture command values for at least one of the first component and the second component before the assembly operation, speed and force command values for the assembly operation; and
   a learning unit for learning, in a related manner, at least one of the state of the assembly, the time required to assemble the first component and the second component, and the information on the force required to assemble the first component and the second component, the result of the continuity test on the assembly, and at least one of the position and posture command values for at least one of the first component and the second component before the assembly operation, and the speed and force command values for the assembly operation, observed by the state observation unit.

2. The machine learning device according to claim 1, wherein the learning unit includes:
   a reward calculation unit for calculating a reward based on at least one of the state of the assembly, the time required to assemble the first component and the second component, and the information on the force required to assemble the first component and the second component, and the result of the continuity test on the assembly, observed by the state observation unit; and a function update unit for updating a function to determine at least one of the position and posture command values for at least one of the first component and the second component before the assembly operation and the speed and force command values for the assembly operation, from the state variables at present based on the reward calculated by the reward calculation unit.

3. The machine learning device according to claim 1, further comprising a decision making unit for determining an optimal value of at least one of the position and posture command values for at least one of the first component and the second component before the assembly operation and the speed and force command values for the assembly operation, from the state variables at present based on the learning result of the learning unit.

4. The machine learning device according to claim 2, wherein the reward calculation unit increases the reward when the state of the assembly, the time required to assemble the first component and the second component and the information on the force required to assemble the first component and the second component, observed by the state observation unit, are within respective allowable ranges, while the reward calculation unit decreases the reward when the state of the assembly, the time required to assemble the first component and the second component and the information on the force required to assemble the first component and the second component are outside of the respective allowable ranges; and the reward calculation unit increases the reward when the continuity test on the assembly produces a favorable result, while the reward calculation unit decreases the reward when the continuity test on the assembly produces an unfavorable result.

5. The machine learning device according to claim 2, wherein the learning unit computes the state variables observed by the state observation unit in a multilayer structure, and updates the function in real time.

6. The machine learning device according to claim 2, wherein the function update unit updates the function using a function updated by a function update unit of another machine learning device.

7. A component assembly system comprising the machine learning device according to claim 1.

* * * * *